US005607200A

United States Patent [19]
Smidler

[11] Patent Number: 5,607,200
[45] Date of Patent: Mar. 4, 1997

[54] CURTAIN SECURING MECHANISM

[75] Inventor: Francis S. Smidler, Lafayette, Ind.

[73] Assignee: Wabash National Corporation, Lafayette, Ind.

[21] Appl. No.: 426,241

[22] Filed: Apr. 21, 1995

[51] Int. Cl.$^6$ ..................................................... B60P 7/04
[52] U.S. Cl. ......................... 296/181; 296/138; 296/183; 160/378
[58] Field of Search ........................... 296/100, 138, 296/181, 183; 160/328, 349.1, 378

[56]  References Cited

U.S. PATENT DOCUMENTS

| | | |
|---|---|---|
| 2,576,613 | 11/1951 | Lermont . |
| 4,389,314 | 6/1983 | Petretti ........................ 296/24.1 X |
| 4,700,985 | 10/1987 | Whitehead ...................... 296/181 |

FOREIGN PATENT DOCUMENTS

| | | | |
|---|---|---|---|
| 164744 | 12/1985 | European Pat. Off. ............... 296/183 |
| 0409340 | 1/1991 | European Pat. Off. . | |
| 2268669 | 4/1974 | France ......................... 296/100 |
| 2667552 | 4/1992 | France ......................... 296/181 |
| 9206151 | 7/1992 | Germany . | |
| 8800228 | 8/1989 | Netherlands ..................... 296/181 |
| 9400110 | 9/1995 | Netherlands . | |
| 605237 | 9/1978 | Switzerland . | |

*Primary Examiner*—Dennis H. Pedder
*Attorney, Agent, or Firm*—Trexler, Bushnell, Giangiorgi & Blackstone, Ltd.

[57]  ABSTRACT

A mechanism is provided for securing a bottom end of a curtain on a curtainside trailer. Each embodiment of the mechanism generally includes a hook-shaped member and a driving mechanism. The hook-shaped member engages the bottom edge of the curtain. The driving mechanism extends the hook-shaped member from underneath the side rail of the trailer so that the hook-shaped member is outboard of the side rail or retracts the hook-shaped member so that the hook-shaped member is positioned completely underneath the side rail of the trailer. The embodiments of the curtain securing mechanism disclosed in FIGS. 1–6 are mechanically driven and include an air actuator which is interconnected to the hook-shaped member to extend or retract the hook-shaped member. The embodiments of the curtain securing mechanism disclosed in FIGS. 7–10 are manually driven and include link members which are attached to the hook-shaped member and to a handle member. The handle member, when manually moved, moves the link members to extend or retract the hook-shaped member.

18 Claims, 3 Drawing Sheets

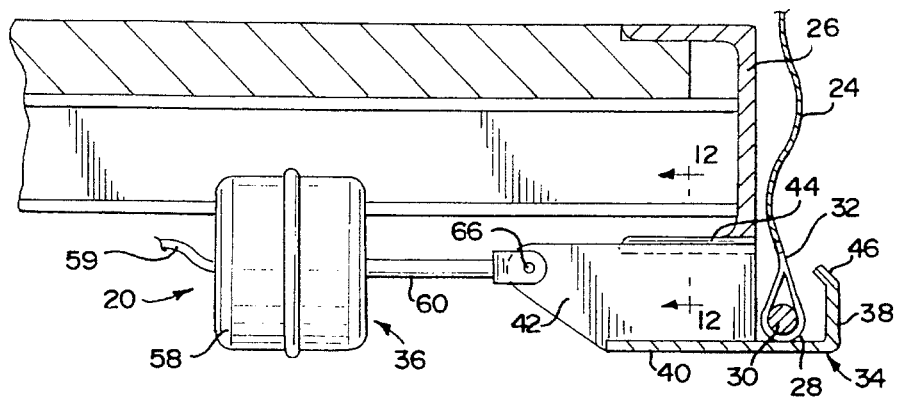
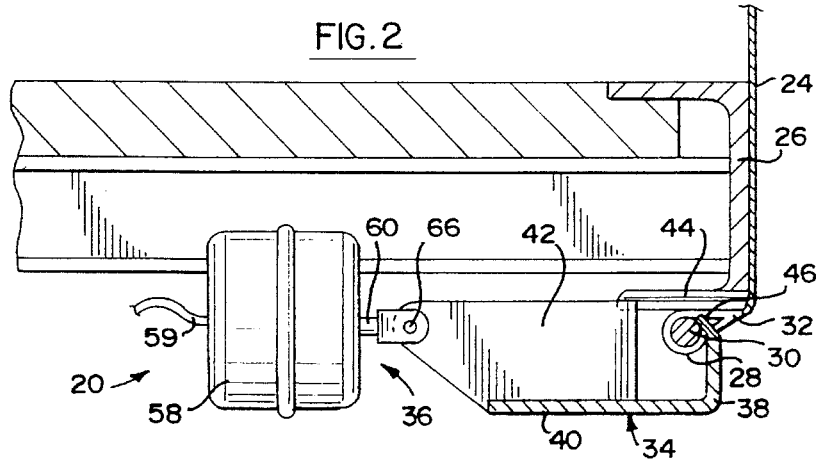
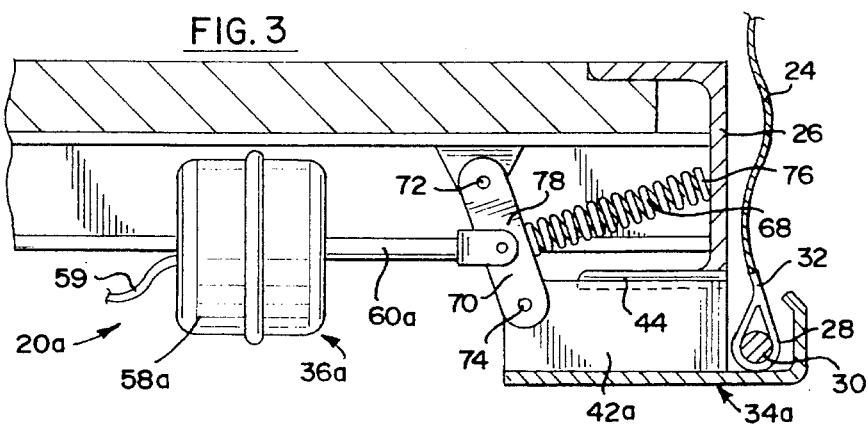
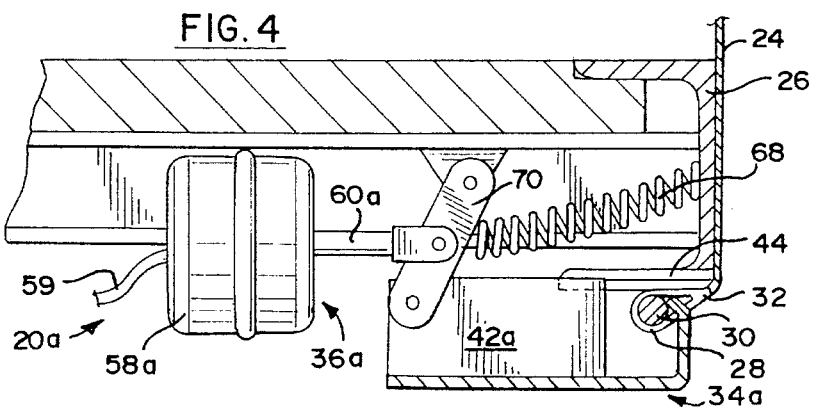

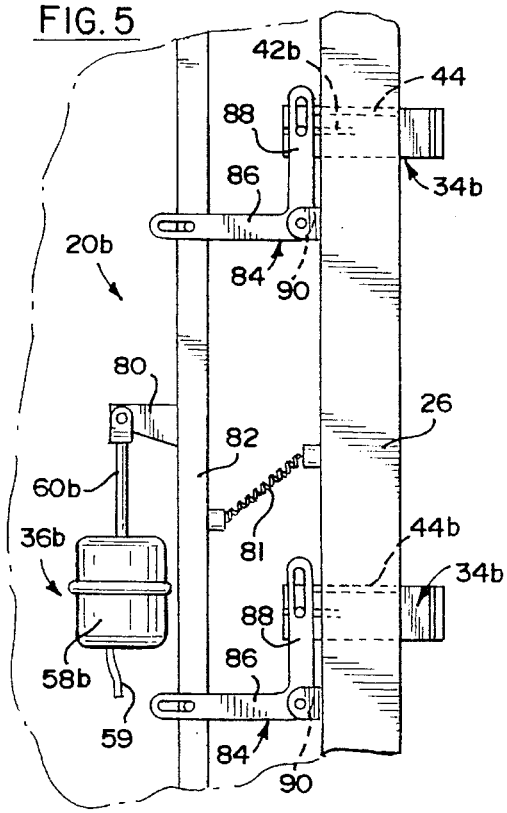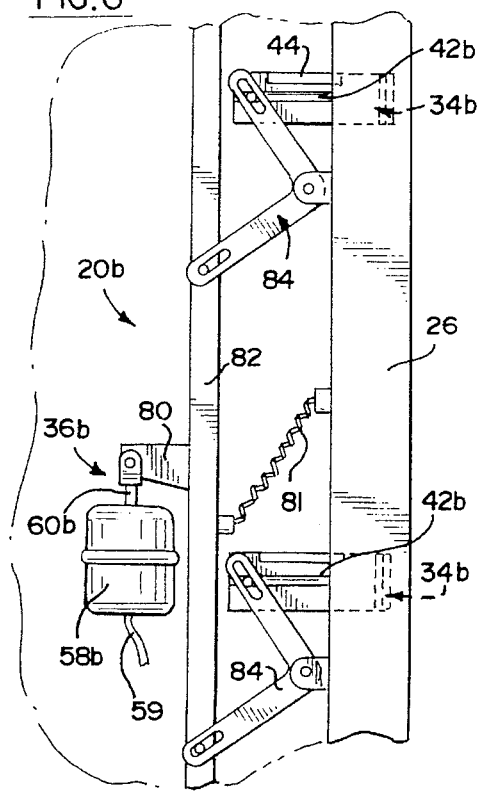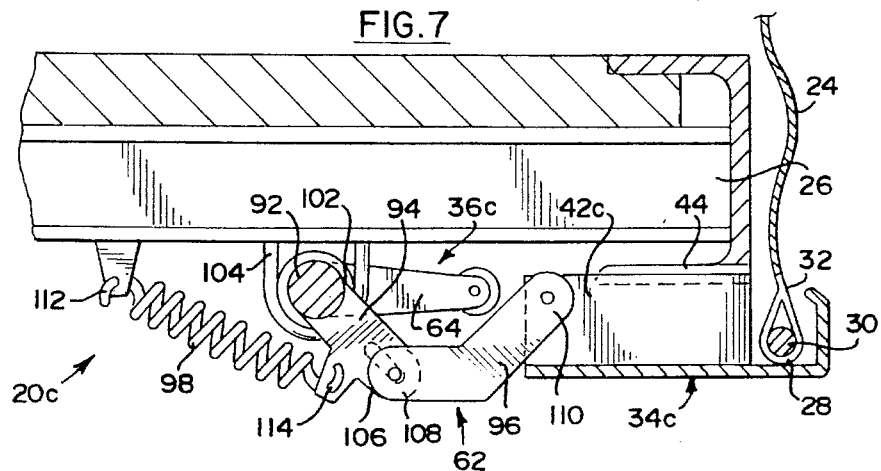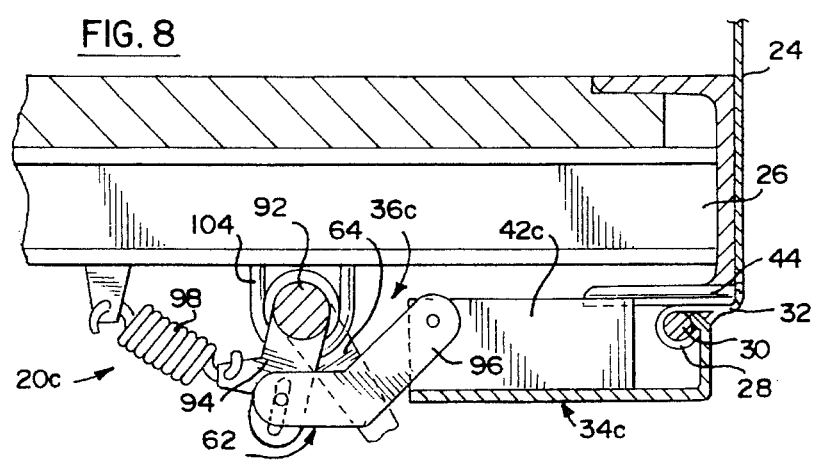

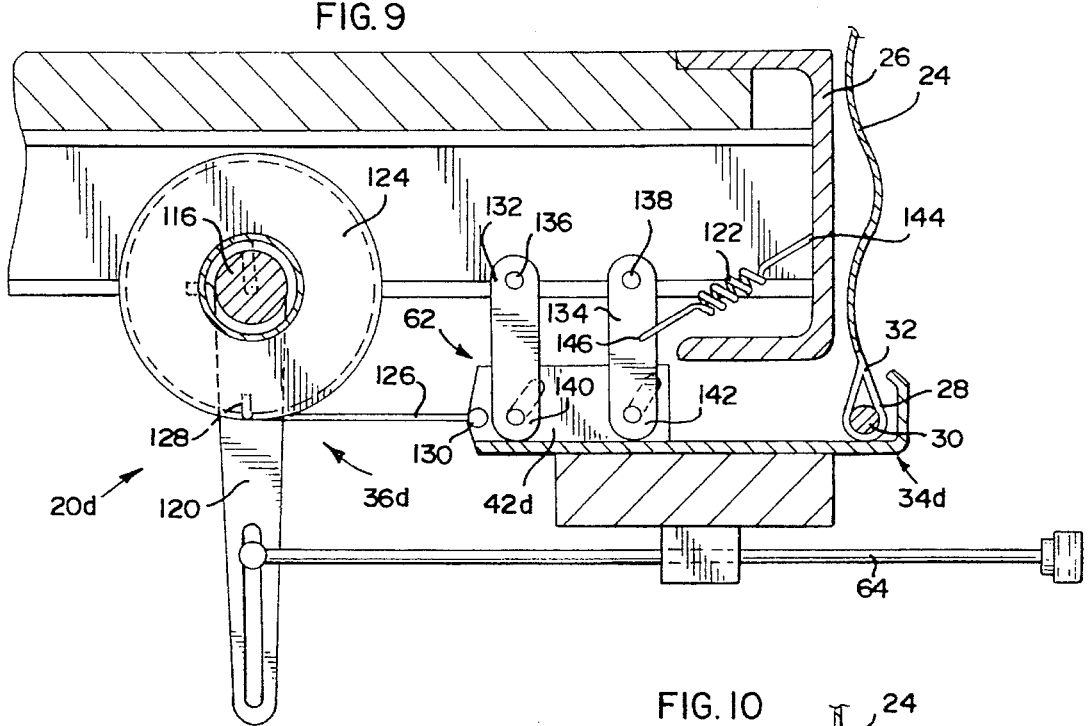
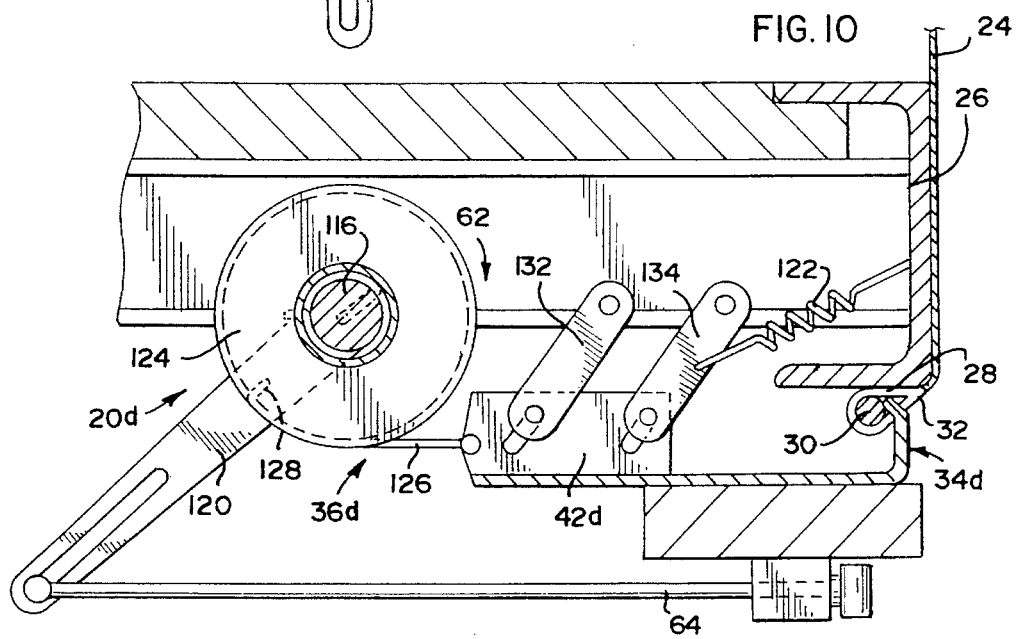
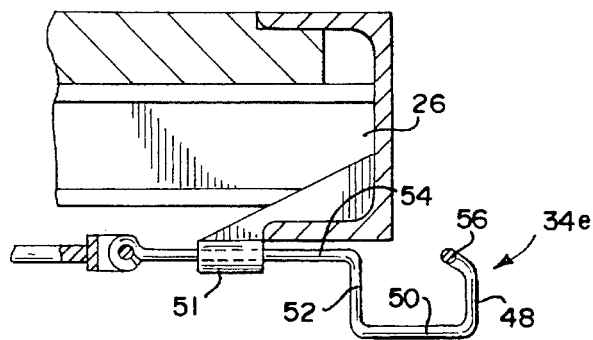

CURTAIN SECURING MECHANISM

BACKGROUND OF THE INVENTION

This invention is generally directed to a novel mechanism for securing a bottom end of a curtain on a curtainside trailer. More particularly, the invention contemplates a mechanically or manually actuable mechanism for securing the bottom end of the curtain underneath a bottom side rail of the curtainside trailer.

Typical curtainside trailers have an open frame. Each open side of the trailer is covered with at least one curtain which is dimensioned to cover the entire side of the trailer. The curtain is attached to an upper side rail of the trailer and extends downwardly therefrom. The curtain has free side edges and a free bottom end. To load goods on the trailer, the curtain is rolled up by suitable known means to allow easy access into the interior of the trailer. Side loading of a trailer is advantageous because greater access to the interior of the trailer is provided than in an end loading process which allows a shipper to quickly and easily load goods therein.

To transport the goods, the free end of the curtain is secured to the trailer so that an enclosure is formed. Commonly, devices such as bungee cords, which are secured to the curtain, are looped around plastic hooks on the trailer frame to secure the free bottom end of the curtain. The bungee cords are usually wrapped in a relatively complex pattern to ensure that the free end of the curtain will not detach from the trailer. This method of curtain securement usually takes a substantial amount of time to configure and manpower.

Therefore, it is desired that an efficient and simple method of curtain securement be provided on curtainside trailers. The present invention is intended to present such a mechanism which quickly and easily secures the free bottom end of a curtain on a curtainside trailer. The curtain securing mechanism of the present invention presents several other advantages and features over the prior art.

OBJECTS AND SUMMARY OF THE INVENTION

A general object of the present invention is to provide a novel mechanism which is used to securely hold a free bottom end of a curtain on a curtainside trailer.

An object of the present invention is to provide a novel mechanism for securing a free end of a curtain on a curtainside trailer which can be easily and quickly operated.

Another object of the present invention is to provide a novel curtain securing mechanism which securely and tightly holds a free end of a curtain on a curtainside trailer to form an enclosure.

Briefly, and in accordance with the foregoing, the present invention discloses a novel mechanism for securing a bottom end of a curtain on a curtainside trailer. A first embodiment of the curtain securing mechanism is shown in FIGS. 1 and 2. Second, third, fourth and fifth embodiments of the curtain securing mechanism are shown in FIGS. 3 and 4; 5 and 6; 7 and 8; and 9 and 10, respectively.

Each embodiment of the mechanism generally includes a hook-shaped member which engages the bottom end of the curtain and a driving mechanism which extends the hook-shaped member from underneath the bottom side rail of the trailer so that the hook-shaped member is outboard of the bottom side rail or retracts the hook-shaped member so that the hook-shaped member is positioned underneath the bottom side rail of the trailer. The embodiments of the curtain securing mechanism disclosed in FIGS. 1–6 are mechanically actuated and include an air actuator, such as an air chamber or air piston cylinder, which is interconnected to the hook-shaped member. Air is used to actuate the air actuator to extend or retract the interconnected hook-shaped member. The air actuator may be directly connected to the hook-shaped member or interconnected to the hook-shaped member by at least one link member. The embodiments of the curtain securing mechanism disclosed in FIGS. 7–10 are manually actuated and include at least one link member which is attached to the hook-shaped member and to a handle. When the handle is moved, the link member moves which causes the hook-shaped member to extend or retract.

Normally, the hook-shaped member is positioned completely underneath the bottom trailer side rail in the retracted position. The hook-shaped member is moved to the extended position when the curtain is to be engaged or disengaged from the hook-shaped member.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 1 is an elevational view of a curtain securing mechanism which incorporates the features of a first embodiment of the invention with the curtain securing mechanism in an extended position;

FIG. 2 is an elevational view of the curtain securing mechanism shown in FIG. 1 with the curtain securing mechanism in a retracted position;

FIG. 3 is an elevational view of a curtain securing mechanism which incorporates the features of a second embodiment of the invention with the curtain securing mechanism in an extended position;

FIG. 4 is an elevational view of the curtain securing mechanism shown in FIG. 3 with the curtain securing mechanism in a retracted position;

FIG. 5 is a plan view of a curtain securing mechanism which incorporates the features of a third embodiment of the invention with the curtain securing mechanism in an extended position;

FIG. 6 is a plan view of the curtain securing mechanism shown in FIG. 5 with the curtain securing mechanism in a retracted position;

FIG. 7 is an elevational view of a curtain securing mechanism which incorporates the features of a fourth embodiment of the invention with the curtain securing mechanism in an extended position;

FIG. 8 is an elevational view of the curtain securing mechanism shown in FIG. 7 with the curtain securing mechanism in a retracted position;

FIG. 9 is an elevational view of a curtain securing mechanism which incorporates the features of a fifth embodiment of the invention with the curtain securing mechanism in an extended position;

FIG. 10 is an elevational view of the curtain securing mechanism shown in FIG. 9 with the curtain securing mechanism in a retracted position;

FIG. 11 is an elevational view of an alternate embodiment for a hook-shaped member which can be used in the curtain securing mechanism of the present invention; and FIG. 12 is a cross-sectional view along line 12—12 in FIGS. 1, 3 and 7.

DETAILED DESCRIPTION OF THE PREFERRED EMBODIMENT

While the invention may be susceptible to embodiment in different forms, there is shown in the drawings, and. herein will be described in detail, specific embodiments with the understanding that the present disclosure is to be considered an exemplification of the principles of the invention, and is not intended to limit the invention to that as illustrated and described herein.

The present invention provides a novel mechanism 20 for quickly and easily securing a curtain 24 on a curtainside trailer. A first embodiment of the curtain securing mechanism 20 is shown in FIGS. 1 and 2. A second embodiment of the curtain securing mechanism 20a is shown in FIGS. 3 and 4. A third embodiment of the curtain securing mechanism 20b is shown in FIGS. 5 and 6. A fourth embodiment of the curtain securing mechanism 20c is shown in FIGS. 7 and 8. A fifth embodiment of the curtain securing mechanism 20d is shown in FIGS. 9 and 10. Like elements are denoted with like reference numerals.

The trailer used in accordance with the present invention is a typical curtainside trailer (not shown) and is not described in detail herein. Generally, the trailer has an open-sided frame which includes an top side rail (not shown), a bottom side rail 26 and vertically extending members which extend between the top and bottom side rails. At least one curtain 24 covers the open sides of the trailer.

The curtain 24 has a top edge (not shown) and a free bottom edge or margin 28. The curtain 24 is formed from a suitable flexible and sturdy material, such as nylon or canvas, and is dimensioned to completely cover the open side of the trailer. A torque tube or rod 30 is secured to the bottom margin 28 of the curtain 24 by suitable means and generally runs the length of the curtain 24. The bottom margin 28 of the curtain 24 may have cutouts 32 along the length of the curtain 24 for reasons described herein.

The top edge of the curtain 24 is secured to the upper side rail of the trailer by suitable means. Suitable, known devices (not shown) for winding and unwinding the curtain 24 are preferably used to roll up and unroll the curtain 24 so that cargo can be easily loaded onto the trailer.

The curtain securing mechanism 20–20d of the present invention is used to secure the free bottom end 28 of the curtain 24. The curtain securing mechanism is described generally with respect to the first embodiment 20 with the understanding that each of the embodiments include the generally-described elements.

The mechanism 20 generally includes a hook-shaped member 34 which engages the bottom edge or margin 28 of the curtain 24 and a driving mechanism 36 which extends the hook-shaped member 34 from underneath the bottom side rail 26 of the trailer so that a portion of the hook-shaped member 34 is outboard of the bottom side rail 26, as shown in FIGS. 1, 3, 5, 7 and 9, or retracts the hook-shaped member 34 so that the hook-shaped member 34 is positioned completely underneath the bottom side rail 26 of the trailer, as shown in FIGS. 2, 4, 6, 8 and 10. Herein, the position shown in FIGS. 1, 3, 5, 7 and 9 is called "the extended position" and the position shown in FIGS. 2, 4, 6, 8 and 10 is called "the retracted position". The hook-shaped member 34 and the driving mechanism 36 are connected together by means described herein in detail.

As shown in FIGS. 1–10, the hook-shaped member 34 has a first leg 38 and a second leg 40 which is generally perpendicular to the first leg 38. The hook-shaped member 34 may be formed of plate steel or other suitable materials. In the embodiments 20–20c shown in FIGS. 1–8, the second leg 38 is attached to the underside of the bottom side rail 26 of the trailer by suitable means, such as an upstanding flange 42 which freely slides along a slide 44 connected to the underside of the bottom side rail 26, as shown in FIG. 12. The embodiment 20d of the curtain securing mechanism shown in FIGS. 9 and 10, can be modified to include a slide arrangement like that shown in the embodiments 20–20c shown in FIG. 12. The first leg 38 may include a bend 46 at its uppermost end which bends inwardly toward the bottom side rail 26 and aids in maintaining the curtain 24 in a secured position as described herein.

Directing attention to FIG. 11, an alternate embodiment of the hook-shaped member 34e is illustrated. The hook-shaped member 34e can be used in any of the embodiments 20–20d of the curtain securing mechanism shown in FIGS. 1–10. The hook-shaped member 34e is formed from round rod and has a first leg 48, a second leg 50 which is generally perpendicular to the first leg 48 and a third leg 52 which is generally perpendicular to the second leg 50 and parallel to the first leg 48. The third leg 52 is connected to the driving mechanism by a rod 54. The rod 54 is slidably connected to the underside of the bottom side rail 26 by suitable means, such as a slide 51, which freely allows the hook-shaped member 34e to move relative thereto. The first leg 48 may include a bend 56 similar to that shown in FIGS. 1–10.

When the hook-shaped member 34 is in the extended position, the bottom edge 28 of the curtain 24 falls into the hook-shaped member 34 when the curtain 24 is unwound. As shown in FIGS. 1, 3, 5, 7 and 9, the curtain 24 is slack when the hook-shaped member is in the extended position. To secure the curtain 24, the hook-shaped member 34 is moved to the retracted position, by means described herein, so that the bottom edge 28 of the curtain 24 is pulled inboard or beneath the bottom side rail 26 of the trailer. When the hook-shaped member 34 is moved to the retracted position, the curtain 24 bends around the corner of the bottom side rail 26 and is tensioned so that a minimal amount of slack remains. The bottom end 28 of the curtain 24 is tightly and securely held by the securing mechanism 20 and thus closes the trailer frame.

Attention is now directed to the specifics of the driving mechanism 36–36d for each embodiment of the curtain securing mechanism 20–20d, respectively. The embodiments of the curtain securing mechanism 20–20b, shown in FIGS. 1–6, are mechanically driven and include an air actuator 58, such as an air chamber or air piston cylinder, which includes a return spring (not shown) therein. Air is used to actuate a piston arm 60, which is interconnected to the hook-shaped member 34, to extend or retract the hook-shaped member 34. The air for the air actuator 58 can be supplied through air line 59 from the air supply of known construction for the vehicle brakes. The air is fed from air supply to the air actuator 58 by suitable controls (not shown). The embodiments of the curtain securing mechanism 20c and 20d, shown in FIGS. 7–10 are manually driven and each include a linkage system 62, as described herein, which is attached to the hook-shaped member 34 and a handle member 64 which is attached to the linkage system 62 to manually move the hook-shaped member 34 under manual power. Normally, the hook-shaped member 34 under manual power is in the retracted position. The hook-shaped member 34 is moved to the extended position when the curtain 34 is to be released so that cargo in the trailer can be loaded or unloaded.

In the first embodiment 20 of the curtain securing mechanism shown in FIGS. 1 and 2, the air actuator 58 is used to directly activate the hook-shaped member 34. The piston arm 60 of the actuator 58 is connected to the inboard end of the upstanding flange 42 by suitable means, such as a pin 66. The piston arm 60 of the actuator 58 can be rigidly interconnected to the upstanding flange 42.

To secure the curtain 24, the hook-shaped member 34 is moved to the extended position, as shown in FIG. 1, from its normally retracted position. The hook-shaped member 34 is normally held in the retracted position by the return spring in the actuator 58.

To move the hook-shaped member 34 to the extended position so that the bottom 28 of the curtain 24 can be placed into the hook-shaped member 34, air is supplied to the actuator 58. This causes the piston arm 60 to extend which causes the hook-shaped member 34 to move to the extended position. Once the hook-shaped member 34 has been moved to the extended position, as shown in FIG. 1, the bottom end 28 of the curtain 34 is placed into the hook-shaped member 34.

Thereafter, the hook-shaped member 34 is moved to the retracted position, as shown in FIG. 2, so that the bottom margin 38 of the curtain 34 is pulled inboard and the curtain 34 is tensioned. To retract the hook-shaped member 34, the air is released from the actuator 58 and the return spring pulls the piston arm 60 back into the actuator 58 which pulls the hook-shaped member 34 inboard. The hook-shaped member 34 is maintained in the retracted position by the return spring even with no air in the system. Thus, the curtain 34 is tightly and securely held by the curtain securing mechanism 20 even with no air in the system.

To remove the curtain 24 from the securing mechanism 20, the hook-shaped member 34 is moved to the extended position by supplying air to the actuator 58 to move the hook-shaped member 34 as described-above. Thereafter, the curtain 24 can be rolled up by suitable, known means to allow a shipper to load or unload cargo.

The second embodiment of the securing mechanism 20a, shown in FIGS. 3 and 4, is similar to the securing mechanism 20 shown in FIGS. 1 and 2 except that an assist spring 68 and a rotatable link member 70 are included. The air actuator 58a is actuated in the same manner as described hereinabove with respect to the first embodiment shown in FIGS. 1 and 2.

The link member 70 has a first end 72 pivotally connected to the underside of the trailer and a second end 74 which is pivotally connected to the inboard end of the upstanding flange 42. A center portion of the link member 70 is pivotally connected to the end of the piston arm 60a. The elements are pivotally interconnected by suitable means, such as pins.

The assist spring 68 has a first end 76 connected to the underside of the trailer and a second end 78 which is connected to approximately the center of the link member 70. The elements are interconnected by suitable means. As shown, the assist spring 68 is a compression spring. It is envisioned, however, that this embodiment of the curtain securing mechanism could be modified to use instead a tension spring.

In the normally retracted position in which the hook-shaped member 34a is held, as shown in FIG. 4, the compression spring 68 is stretched. The tendency of the compression spring 68 to return to a compressed state cannot overcome the return spring in the actuator 58a. Thus, the hook-shaped member 34a is normally held in the retracted position.

When the piston arm 60a is extended to extend the hook-shaped member 34a to the extended position, as shown in FIG. 4, the link member 70 pivots which causes the hook-shaped member 34a to slide along the slide 44 and extend. Since the air being supplied to the actuator 58a overpowers the return spring therein, the compression spring 68 is allowed to return to its compressed state and aids in pivoting the link member 70. The compression spring 68 also provides leverage which allows for a greater stroke of the hook-shaped member 34a.

The third embodiment 20b of the curtain securing mechanism, shown in FIGS. 5 and 6, includes an air actuator 58b which is similar to the ones used in and is actuated in the same manner as described hereinabove with respect to the first and second embodiments. In this embodiment 20b of the curtain securing mechanism, the piston arm 60b of the actuator 58b is connected to a flange 80 by suitable means. The flange 80 is connected at its opposite end to an elongate linkage bar 82 which extends axially along generally the length of the trailer. The piston arm 60b and the elongate linkage bar 82 are parallel to each other. A spring 81, shown as a compression spring, is interconnected between the linkage bar 82 and the underside of the trailer by suitable means. The curtain 24 is not shown in this embodiment for clarity in explanation.

The elongate bar 82 is connected to a plurality of hook-shaped members 34b by separate L-shaped link members 84. Each L-shaped link member 84 has a first leg 86 and a second leg 88 which is perpendicular to the first leg 86 and is integrally joined to the first leg 86 at an elbow 90. The first leg 86 of each L-shaped link member 84 is connected to the elongate bar 82 by suitable means which allow the members 82, 84 to move relative to each other. As shown, the first leg 86 of the L-shaped link member 84 has an elongate slot and the bar 82 has a pin which is slidably engaged within the slot. The second leg 88 of each L-shaped link member 84 is connected to the top of the upstanding flange 42b of the hook-shaped member 34b at its inboard end by suitable means which allow the members 34b, 84b to move relative to each other. As shown, the second leg 88 of the L-shaped link member 84 has an elongate slot and the upstanding flange 42b of the hook-shaped member 34b has a pin which is slidably engaged within the slot. It is envisioned that other forms of sliding arrangements can be used. The elbow 90 is pivotally connected to the underside of the trailer by suitable means, such as a pin.

Normally, each hook-shaped member 34b is held in the retracted position as shown in FIG. 6 and the spring 81 is decompressed. The tendency of the spring 81 to return to the compressed state cannot normally overcome the return spring in the actuator 58b and thus the hook-shaped member 34b remains in the retracted position. When the piston arm 60b of the actuator 58b is extended to extend each hook-shaped member 34b to the extended position, as shown in FIG. 5, the elongate linkage bar 82 moves lengthwise along the trailer which causes each L-shaped linkage member 84 to pivot. The spring 81 is allowed to return to the compressed state and aids in moving the linkage bar 81. When the linkage members 84 pivot, each hook-shaped member 34b slides along the respective slide 44b and moves to the extended position.

To retract the hook-shaped members 34b to the retracted position, shown in FIG. 6, after the bottom end 38 of the curtain has been captured therein, the air is released from the actuator 58b. The return spring pulls the piston arm 60b into the actuator 58b which pulls the bar 82 lengthwise along the trailer in the opposite direction to that described above which causes each L-shaped linkage member 84 to pivot and the spring 81 to decompress. When the linkage members 84 pivot, each hook-shaped member 34b slides along the respective slide 44b and moves to the retracted position.

Attention is now directed to the embodiments of the curtain securing mechanism shown in FIGS. 7–10 which are manually actuated. As shown in FIGS. 7 and 8, the fourth embodiment 20c of the curtain securing mechanism generally includes a torque tube 92 which is interconnected to the hook-shaped member 34c by a first link member 94 and a second link member 96. The link members 94, 96 are spring loaded by a compression spring 98.

The torque tube 92 is rigidly connected to the handle 64 and to a first end 102 of the first link member 94 along the length of the tube 92. The torque tube 92 is rotatable with respect to the trailer and is connected to the underside of the trailer by suitable means, such as a U-shaped channel member 104.

A second end 106 of the first link member 94 is slidably interconnected to a first end 108 of the second link member 96 by suitable means. Such means can be a pin on the first end 108 of the second link member 96 which is interconnected into a slot on the second end 106 of the first link member 94. A second end 110 of the second link member is fixedly connected to the inboard end of the upstanding flange 42c of the hook-shaped member 34c by suitable means.

The compression spring 98 has a first end 112 which is fixedly connected to the underside of the trailer by suitable means. A second end 114 of the compression spring 98 is fixedly connected to a center portion of the first link member 94 by suitable means.

When the hook-shaped member 34c is in its normally retracted position, the spring 98 is in its naturally compressed state. To move the hook-shaped member 34c to the extended position, the handle 64 is manually rotated. The spring 98 decompresses as the handle 64 is rotated. Rotation of the handle 64 causes the torque tube 92 to rotate and the first link member 94 to rotate simultaneously. The pin on the second end 106 of the first link member 94 moves along the length of the slot in the second end 108 of the second link member 96 which causes the second link member 96 to translate parallel to the underside of the trailer, as the first link member 94 rotates with the torque tube 92. As the second link member 96 translates, the hook-shaped member 34c is pushed outwardly from underneath the bottom side rail 26 of the trailer. Thereafter, the bottom 28 of the curtain 24 is placed into the hook-shaped member 34c as shown in FIG. 7.

To retract the hook-shaped member 34c, the handle 64 is rotated in the opposite direction to that described above. Since the spring 98 is a compression spring, its natural tendency is to return to a compressed state. When the handle 64 is rotated, the spring 98 is allowed to return to its compressed state and aids in pulling the hook-shaped member 38c inboard to the retracted position.

The handle 64 provided in this embodiment can be detachably attached to the torque tube 92 so that it can be disconnected from the torque tube 92, or permanently attached to the torque tube 92 and folded inward so that it is positioned underneath the trailer when the hook-shaped member 34c is in the retracted position.

The embodiment 20d of the manually actuated curtain securing mechanism illustrated in FIGS. 9 and 10 includes a torque tube 116 which is interconnected to the hook-shaped member 34d by a series of link members and a wrapping cable, as described herein, and is connected to the handle 64 by a link member 120. A lightweight release spring 122 is connected to a link member to aid in moving the hook-shaped member 34d to the extended position.

The torque tube 116 has a circular flange 124 which encircles the torque tube 116 and is fixedly connected to the torque tube 116 along its length. A flexible element 126, such as a cable, is wrapped around the perimeter of the circular flange 124 and has a first end 128 which is fixedly connected to the circular flange 124 and a second end 130 which is fixedly connected to the inboard end of the upstanding flange 42d on the hook-shaped member 34d by suitable means.

A first link member 132 and a second link member 134 have a first end 136, 138, respectively, pivotally attached to the underside of the trailer by suitable means and have a second end 140, 142, respectively, which is slidably connected to the upstanding flange 42d by suitable means. The second end 140, 142 of each of the members 132, 134 may include a pin thereon which is slidably interconnected within respective slots in the upstanding flange 42d on the hook-shaped member 34d.

The lightweight release spring 122 has a first end 144 which is fixedly connected to the underside of the trailer and a second end 146 which is fixedly connected to a center portion of the second link member 134. As shown, the lightweight release spring 122 is a compression spring.

The torque tube 116 is rotatable with respect to the trailer and is connected to the underside of the trailer by suitable means, such as a U-shaped channel member (not shown). The torque tube 116 is connected to the handle 64 by link member 120 which is positioned along the length of the tube 116. The link member 120 and the torque tube 116 are rigidly interconnected. The connected ends of the handle 64 and the link member 120 are slidably interconnected to each other by suitable means. As shown, the end of the handle 64 has a pin formed thereon which slides along the length of a slot formed in the end of the link member 120.

When the hook-shaped member 34d is in its normally retracted position, the lightweight release spring 122 is in a decompressed state and the natural tendency of the spring 122 to return to the compressed state cannot normally overcome the rest of the system. Thus, the hook-shaped member 34d remains in the retracted position.

To move the hook-shaped member 34d to the extended position, the handle 64 is pulled outwardly from under the bottom side rail 26 of the trailer which causes the torque tube 116 and associated circular flange 124 to rotate. The flexible element 126 unwinds from around the flange 124 and pushes on the upstanding flange 42d on the hook-shaped member 34d. This action causes the first and second link members 132, 134 to pivot relative to the underside of the trailer and the pins on the members 132, 134 to slide within the slots in the upstanding flange 42d which causes the hook-shaped member to extend outwardly from under the bottom side rail 26 of the trailer. If the flexible element 126 is unable to push out the hook-shaped member 34d on its own, the lightweight release spring 122 aids in pulling the hook-shaped member 34d outboard by pulling and acting on the second link member 134 which causes the first and second link members 132, 134 to pivot. The slide is eliminated in this embodiment.

To move the hook-shaped member 34d to the retracted position as shown in FIG. 10, the handle 64 is pushed inwardly. This action causes the flexible element 126 to wind around the circular flange 124 thus pivoting the first and second link members 132, 134 and pulling the hook-shaped member 34d inboard to the retracted position.

Each curtain securing mechanism 20–20d is provided with a plurality of hook-shaped members to capture the end 28 of the curtain 24 therein. In the embodiments of the curtain securing mechanism that are mechanically actuated, each hook-shaped member 34 can have a separate air actuator to move the member. The air actuators are commonly actuated by the same control circuitry so that each air actuator is actuated at the same time.

If the bottom 28 of the curtain 24 is provided with cutouts 32, the hook-shaped members 34 directly engage the torque tube 30 in the curtain 24. The cutouts 32 preferably have a length which is longer than the width of the respective hook-shaped member 34 so that the curtain 24 is not engaged by the hook-shaped member 34. When the hook-shaped members 34 are moved to the retracted position, the hook-shaped members 34 securely engage and grasp the torque tube 30 in the bottom 28 of the curtain 24 so as to form a more secure engagement. If the hook-shaped member 34 has an inward bend 46 at its top, the inward bend 46 engages the torque tube 30 and provides a better securement of the curtain tube 30 within the hook-shaped member 34.

While preferred embodiments of the present invention are shown and described, it is envisioned that those skilled in the art may devise various modifications of the present invention without departing from the spirit and scope of the appended claims.

The invention claimed is:

1. A mechanism in a trailer having a body and a hanging side curtain on said body having a lower end extending substantially to a lower side rail of said body, said mechanism being mounted beneath said lower rail for securing said lower end of said curtain, said mechanism including an upwardly-facing hook-shaped member having an outer-end portion, means supporting said hook-shaped member for movement between a retracted position and an extended position in which said upwardly-facing hook-shaped member outer-end portion is substantially in vertical alignment with said side curtain and laterally outwardly of said body for receiving said lower-end of said curtain, and means connected with said hook-shaped member for selectively retracting and extending said hook-shaped member to move said outer-end portion from said extended position to said retracted position substantially beneath said body for securing and tensioning said lower-end of the curtain and conversely.

2. A structure, as defined in claim 1, wherein said curtain includes a rod at said lower-end, which rod extends for substantially the entire length of the curtain, said hook-shaped member engaging said rod for securing and tensioning the curtain.

3. A mechanism as defined in claim 1, wherein said hook-shaped member comprises a first leg and a second leg, said first leg having a bend at a top portion of said first leg, said bend bending inward towards the side rail of the trailer.

4. A mechanism as defined in claim 1, wherein said means for retracting said hook-shaped member underneath a side rail of said trailer and extending said hook-shaped member from underneath said side rail comprises a selectively actuable air actuator connected to said hook-shaped member.

5. A mechanism as defined in claim 4, further including at least one link member interconnected between said hook-shaped member and said air actuator.

6. A mechanism as defined in claim 5, further including a spring member interconnected between said trailer body and said link member.

7. A mechanism as defined in claim 6, wherein said spring is a compression spring.

8. A mechanism as defined in claim 1, wherein said means for retracting said hook-shaped member underneath a side rail of said trailer and extending said hook-shaped member from underneath said side rail comprises at least one link member connected to said hook-shaped member which is movable to move said hook-shaped member from a retracted position underneath the side rail of the trailer to an extended position outward from underneath the side rail of the trailer.

9. A mechanism as defined in claim 8, further including a handle member connected to said link member, said handle member being movable to move said at least one link member.

10. A mechanism as defined in claim 8, further including a spring attached between said trailer and said link member.

11. A mechanism as defined in claim 8, which includes an air actuator for actuating said link.

12. A mechanism as defined in claim 8, which includes a plurality of said hook-shaped members and link members spaced along the trailer and a common actuator connected with each of said link members.

13. A mechanism as defined in claim 12, wherein said actuator comprises an elongated member and means for axially shifting said elongated member.

14. A mechanism as defined in claim 13, wherein said last named means comprises an air actuator and a spring.

15. A mechanism as defined in claim 1, wherein said means for retracting said hook-shaped member underneath the side rail of said trailer and extending said hook-shaped member from underneath said side rail comprises a rotatable flange connected to said trailer, a flexible element interconnected between said flange and said hook-shaped member, said flange being rotatable to wind said flexible element around said flange to retract said hook-shaped member underneath said side rail of said trailer and to unwind said flexible element from around said flange to extend said hook-shaped member outwardly from underneath the side rail of said trailer.

16. A mechanism as defined in claim 15, further including a handle member connected to said flange, said handle member being movable to rotate said flange.

17. A mechanism as defined in claim 15, further including at least one link member interconnected between said trailer body and said hook-shaped member.

18. A structure, as defined in claim 1, wherein said outer-end portion of the hook-shaped member includes a generally horizontal element and an upstanding end element, and said means supporting said hook-shaped member locates the hook-shaped member for enabling the vertical outer-end element to pass beneath said lower rail.

* * * * *